US009026654B2

(12) United States Patent
Meloche et al.

(10) Patent No.: US 9,026,654 B2
(45) Date of Patent: May 5, 2015

(54) PEER-TO-PEER OVERLAY GRAPH CONSTRUCTION

(75) Inventors: Jean Meloche, Madison, NJ (US); Shalini Yajnik, Berkeley Heights, NJ (US); Parameshwaran Krishnan, Basking Ridge, NJ (US); Stanko Dimitrov, Ann Arbor, MI (US); Colin L. Mallows, Flemington, NJ (US); Jon Bentley, New Providence, NJ (US)

(73) Assignee: Avaya Inc., Basking Ridge, NJ (US)

( * ) Notice: Subject to any disclaimer, the term of this patent is extended or adjusted under 35 U.S.C. 154(b) by 2576 days.

(21) Appl. No.: 11/586,709

(22) Filed: Oct. 26, 2006

(65) Prior Publication Data

US 2008/0155520 A1 Jun. 26, 2008

(51) Int. Cl.
*G06F 15/173* (2006.01)
*H04L 12/24* (2006.01)
*H04L 12/26* (2006.01)

(52) U.S. Cl.
CPC ............... *H04L 41/12* (2013.01); *H04L 41/06* (2013.01); *H04L 43/0811* (2013.01)

(58) Field of Classification Search
USPC ................ 709/223, 226; 717/100, 151, 157
See application file for complete search history.

(56) References Cited

U.S. PATENT DOCUMENTS 4,905,233 A * 2/1990 Cain et al. ...................... 370/237
6,044,075 A * 3/2000 Le Boudec et al. ........... 370/351
6,098,107 A * 8/2000 Narvaez-Guarnieri et al. ............. 709/239
7,761,569 B2 * 7/2010 Hopkins ....................... 709/226
2008/0005188 A1 * 1/2008 Li et al. ......................... 707/201

FOREIGN PATENT DOCUMENTS

WO WO 2005/120102 12/2005
WO WO 2006/068365 6/2006

OTHER PUBLICATIONS

R. Melamed and I. Keidar, "Araneola: A Scalable Reliable Multicast System for Dynamic Environment", 3rd IEEE International Symposium on Network Computing and Applications (IEEE NCA), pp. 5-14, Sep. 2004.
G. Pandurangan, P. Raghavan, and E. Upfal, "Building Low-Diameter Peer-to-Peer Networks", IEEE Journal on Selected Areas in Communications, 21(6):995-1002, Aug. 2003.
X. Hou and T.Wang, "On Generalized $k$-Diameter of $k$-Regular $k$-Connected Graphs", Taiwanese Journal of Mathematics, 8(4):739-745, Dec. 2004.
X. Hou and T. Wang, "An Algorithm to Construct $k$-Regular $k$-Connected Graphs with Maximum $k$-Diameter", Graphs and Combinatorics, 19:111-119, 2003.
J. Rosenberg et al., STUN—Simple Traversal of User Datagram Protocol (UDP) Through Network Address Translators (NATs)—RFC 3489, http://www.faqs.orglrfcslrfc3489.html, Mar. 2003.

* cited by examiner

*Primary Examiner* — Umar Cheema
(74) *Attorney, Agent, or Firm* — Muncy, Geissler, Olds & Lowe, P.C.

(57) ABSTRACT

Systems and methods for constructing and maintaining a peer-to-peer overlay graph are disclosed herein. The systems and methods include adding a node to the overlay graph. Adding the node includes choosing an edge that is not connected to the node, breaking the edge and connecting the node to broken edge nodes previously connected to the edge. The process is repeating if additional connections are need and node addition data is stored for the node.

29 Claims, 10 Drawing Sheets

PEER-TO-PEER OVERLAY GRAPH CONSTRUCTION

BACKGROUND OF THE INVENTION

1. Field of the Invention

The present invention relates to a system and a method for constructing peer-to-peer overlay graphs in a network environment.

2. Description of Background Art

The mapping of network architectures is a well studied field. Efficiently building and maintaining resilient overlay networks is important for many applications. As used herein resilient networks can be considered as networks that operate even in the presence of faults either through tolerance of faults or through some repair techniques in the presence of faults. Additionally, an overlay network is a virtual network of nodes and links built on top of an already existing network. The overlay may also provide some additional services that are not provided by the underlying network. Such overlay networks should be easy to build and maintain in the presence of overlay node additions and deletions. They also should have high resilience, low latency and bounded resource usage at any node. The graphs modeling these overlay networks should also be highly connected, have low diameter, and bounded degree at each node. Regular graphs exhibit several of these desired properties and have been investigated for efficient overlay design. Typically, algorithms use offline techniques to build regular graphs with strict bounds on resilience and such techniques are not designed to maintain these properties in the presence of online additions, deletions and failures. On the other hand, random regular graphs are easy to construct and maintain, and provide good properties without strict guarantees.

The generation of random graphs with a given degree sequence is a method attributed to Molloy and Reed. The method is general and does not necessarily produce a connected graph. Such graphs can be then connected but the computational burden of this correction is substantial.

Regular graphs, i.e., graphs with a fixed degree at each node, have been studied as candidates for overlay design (see, e.g., R. Melamed and I. Keidar, "Araneola: A Scalable Reliable Multicast System for Dynamic Environment", 3rd IEEE International Symposium on Network Computing and Applications (IEEE NCA), pages 5-14, September 2004, and G. Pandurangan, P. Raghavan, and E. Upfal, "Building Low-Diameter Peer-to-Peer Networks", IEEE Journal on Selected Areas in Communications, 21(6):995-1002, August 2003). A number of algorithms presented in literature use offline techniques to construct regular graphs with guaranteed bounds on resilience (see, e.g., X. Hou and T. Wang, "On Generalized k-Diameter of k-Regular k-Connected Graphs", Taiwanese Journal of Mathematics, 8(4):739-745, December 2004, and X. Hou and T. Wang, "An Algorithm to Construct k-Regular k Connected Graphs with Maximum k-Diameter", Graphs and Combinatorics, 19:111-119, 2003). However, these techniques have to be necessarily offline due to the large number of computations required to explore the solution space and provide strict bounds on the resilience. These techniques are not designed to maintain the required properties in the presence of joins, leaves and failures of the overlay nodes.

Randomized algorithms can be effectively used to solve problems very efficiently while providing good guarantees either in the average case, or with provably high probability. Random graphs can be built without any global knowledge and hence are good candidates for distributed design. In particular, Pandurangan et al. present a randomized graph building scheme for low diameter peer-to-peer networks with a bounded degree (see, G. Pandurangan, P. Raghavan, and E. Upfal, "Building Low-Diameter Peer-to-Peer Networks", IEEE Journal on Selected Areas in Communications, 21(6):995-1002, August 2003). However, their scheme focuses on building low-diameter connected graphs and not on guarantees on the resilience of the resulting network to node and edge failures. Further, the method proposed by Pandurangan et al. requires a central server.

Random regular graphs are fixed degree graphs built using a randomized approach, and as such can be constructed in a distributed way, although the graphs may not necessarily be selected with equal probabilities. These graphs of degree d have interesting properties like d-connectedness not in the worst case but with a very high probability. As an example, the Araneola multicast overlays, noted above, are built using random regular graphs and rely on the connectedness and low diameter properties of random regular graphs to ensure that their multicast overlay is resilient with a high probability. There are, however, no strict guarantees on the resilience of such graphs.

SUMMARY OF THE INVENTION

Embodiments of the invention include a method and an apparatus for constructing peer-to-peer overlay graphs in a network environment.

Accordingly, an embodiment of the invention can include a method for constructing a peer-to-peer overlay graph, comprising: adding a node j to the overlay graph, where adding the node j includes: choosing an edge that is not connected to the node j; breaking the edge and connecting the node j to broken edge nodes previously connected to the edge; and repeating the adding process if additional connections are needed.

Accordingly, an embodiment of the invention can include an apparatus for constructing a peer-to-peer overlay graph, comprising: logic configured to add a node j to the overlay graph, wherein the logic configured to add the node j includes: logic configured to choose an edge that is not connected to the node j; logic configured to break the edge and to connect the node j to broken edge nodes previously connected to the edge; and logic configured to repeat the adding process if additional connections are needed.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
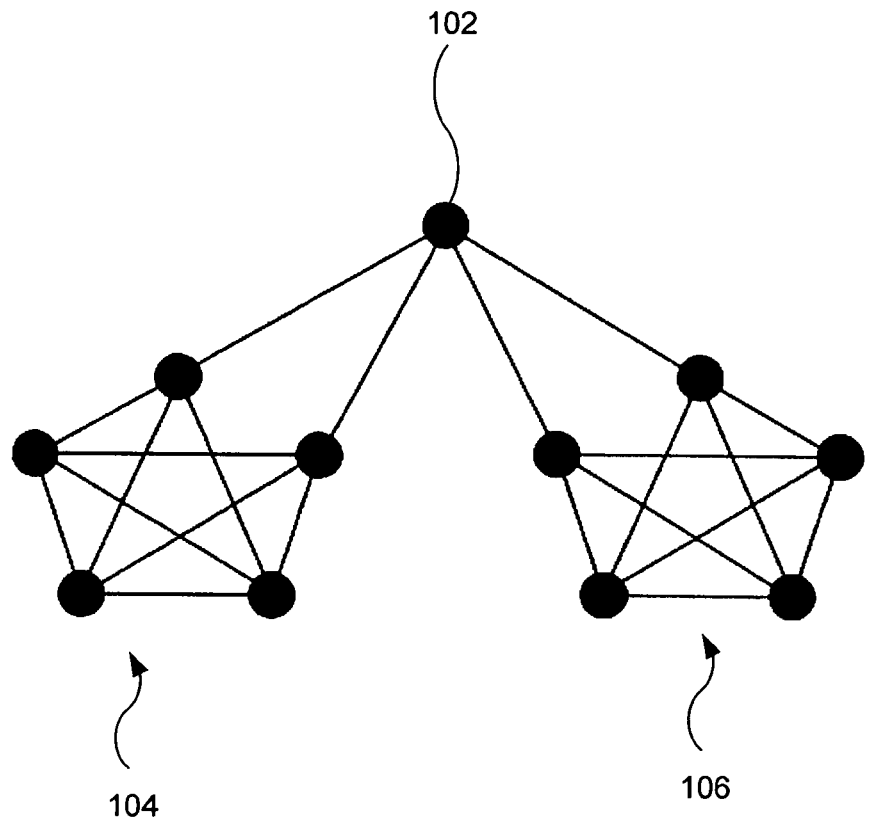
FIG. 1 illustrates an overlay graph that is a d regular graph.
Figure 2:
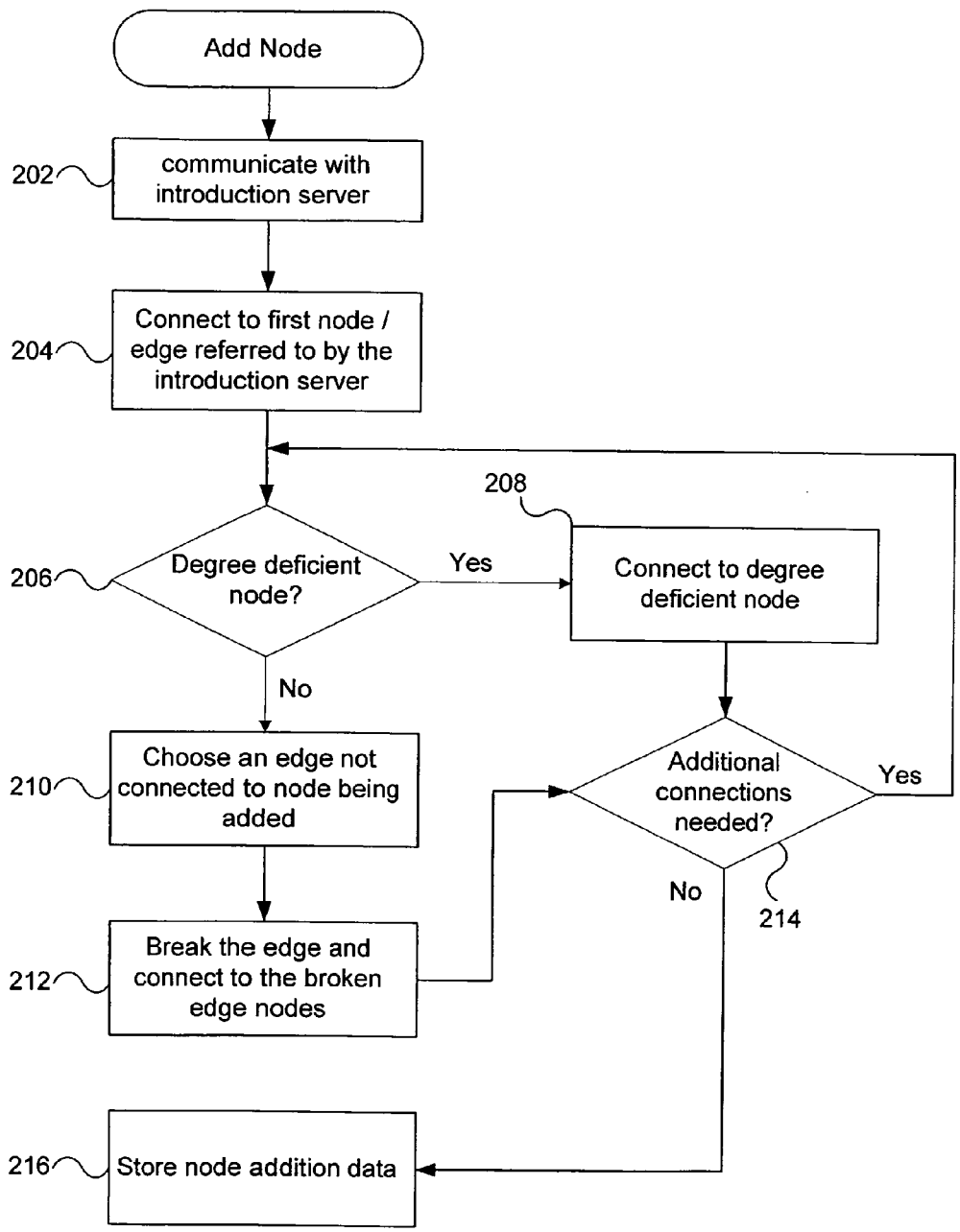
FIG. 2 illustrates a flowchart representing methods in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Overlay networks have been used extensively in a number of domains to provide specific services over wide area networks. Examples of services that exploit overlays include multicast, peer-to-peer information storage and retrieval, event distribution, instant messaging, VoIP, file-sharing, and, distributed content storage. A number of services running on these overlays may have strict latency and availability requirements (e.g., instant messaging, and VoIP). Overlay networks that aim to provide real-time services should be engineered for low latency and high resilience. In some cases, the overlay nodes are either hosted on low-end devices or are fronted by end devices like network address translators (NATs) and gateways that limit the computing and connectivity resources that such nodes offer to the overlay network. In general, and especially when the nodes are constrained, the overlay network construction should limit the network connectivity requirements on any node. The nodes in an overlay network may be highly dynamic in nature and may join and leave the overlay at will. In addition, overlay nodes may also be prone to failures and disconnects. As used herein, a node is said to be disconnected if it does not have an edge to any other node in the graph. Without careful design considerations, building and maintaining efficient overlays in the presence of joins and leaves and failures can be an expensive/inefficient operation.

Overlay networks have traditionally been modeled as graphs. Accordingly, building overlay networks can in some circumstance be viewed as a graph building problem. Mapping the overlay network requirements into the graph domain can place constraints on the overlay graphs. For example, graphs should be built to have low diameter (for low latency), high degree of connectedness (for resilience), and bounded degree at each node (to support limited connectivity resources). Additionally, the dynamic nature of nodes in the overlay networks combined with the failures in the network implies that in order to meet the resilience and resource requirements, the graph building and maintenance should be an on-line and distributed process. In the present specification the terms overlays and graphs are used interchangeably.

Embodiments of the invention address the problem of constructing resilient overlays. Embodiments of the invention can result in resilient random regular ($r^3$) graphs. The $r^3$ graphs are easy to build and maintain in the presence of node arrivals and departures. The graph building is done in a distributed way using constrained random choices as each node is added to the overlay, providing efficiency. Further, the resulting graph is provably 1+d/2-node and d edge-connected resulting in very high guaranteed resilience. Accordingly, embodiments of the invention use the best properties of random graph building with structured maintenance to achieve efficiency as well as guarantees on resilience. Additional properties of the $r^3$ graphs, e.g., diameter bounds and lack of expander properties, are also discussed herein.

As suggested earlier, a regular graph picked uniformly at random from the set of all regular graphs is known to have many desirable properties with high probability. In particular, a regular graph picked at random is likely to be d-node connected provided that the selection was made with uniform probabilities. On the other hand, whether some constrained random selection scheme enjoys the same properties can be very hard to establish. However, embodiments of the present invention guarantee 1+d/2 node-connectedness and in addition, the connected property is independent of the random selections.

Environments such as real-time applications over a peer-to-peer network operating behind network address translators (NATs) can use embodiments of the present invention. The nodes that are part of the network can be consumer devices and may join and leave the network at will. In this environment, the NATs restrict the number of simultaneous connections that can be kept open through them resulting in the bounded connectivity constraint. Further, the node arrival and departure constraint necessitates the resilience requirement on any overlay built. Accordingly, embodiments of the invention can include systems including network address translators and related devices.

Further, a distributed implementation of building $r^3$ graphs, and maintaining it in the presence of node additions, deletions and failures are described. Simulation results are also presented that demonstrate several interesting properties of the $r^3$ graphs constructed. In particular, the low diameter (related to latency) of the $r^3$ graphs, high resilience (node and edge connectedness) that typically exceeds the theoretical bounds and results related to performance with broadcast (useful in many routing and broadcast functions) are discussed in the following. Further, the following description provides additional details of an implementation of the process and discusses how the process is distributed both in terms of storage and computation.

A brief definition of basic graph terms and the notations used herein follows. The overlay network and its connections are modeled as a graph G(V, E), where V is the set of nodes in the overlay and E is the set of edges between the nodes. Where it is clear from context, the notation of the explicit dependence of G on V, E, may be dropped. The degree of a node v∈V is the number of edges incident on node v. In a d-regular graph, every node v∈V has a degree d. The length $\max_{u,v} d(u, v)$ of the longest shortest path between any two nodes u and v is called the diameter of the graph. The set $G_d$ denotes the set of all d-regular graphs. The algorithms defined in the following create specific types of d-regular graphs that we call $r^3$ graphs. We denote the set of all d-regular graphs that could potentially be created by our algorithm as $G_{r^3}(d)$, where $G_{r^3}(d) \subseteq G_d$. $G_{r^3}^A$ denotes the set $\cup_d G_{r^3}(d)$. In the following, $G_{r^3}$ can be used to represent $G_{r^3}(d)$, where the implicit dependence on d will be clear from context. |S| is used to denote the cardinality of the set S or the number of nodes in S, if S is a graph.

A graph is connected if every node can reach every other node. In other words, a connected graph has one connected component. A graph G is said to be k-node (k-edge) connected if there does not exist a set of k−1 nodes (edges) whose removal disconnects the graph. Embodiments of the invention address efficiently building regular graphs that are provably k connected for some k. Clearly, d regular graphs can at best be d-node connected (and random d regular graphs are d connected with high probability). However, some d regular graphs are not even 2-node connected, such as illustrated in FIG. 1. The single node 102 at the top is critical to the connectivity of the left 104 and right 106 subgraphs. As used herein, resilience of a graph is a measure of how large k is, given that the graph is provably k-node connected.

The complete graph on d nodes is denoted by $K_d$. When constructing a d regular graph, a node is called degree deficient if it has a degree strictly smaller than d. For a d-regular graph G(V, E) not to have degree deficient nodes, |V|≥d+1. Further, if d is odd and |V| is odd, there will be at least one degree deficient node.

The following describes how to build and maintain an overlay graph G∈$G_{r^3}$ according to at least one embodiment of the invention. As pointed out earlier, random regular graphs have most of the desired properties needed for robust overlay design. Embodiments of the invention build a random fixed degree graph. An overlay network is a dynamically changing network where nodes join, leave and potentially fail. The graph construction should implement some basic maintenance protocol to repair the overlay and bring it to a desirable state whenever a join/leave/failure event occurs. A specific protocol for implementing the graph building and maintenance in a distributed way, and system considerations therein, is the subject of further discussion below. The graph building process described below effectively defines the set $G_{r^3}$. Note, the term $r^3$ is used to denote a graph in the set $G_{r^3}$.

Building the graph G∈$G_{r^3}(d)$ is an iterative process of adding nodes to the graph. Let G' be the graph in the iterative process when node x is to be added. When adding node x to a graph G', node x first connects with (up to d) degree deficient nodes in G'. If there are no degree deficient nodes, node x chooses an edge (y, z) such that it (node x) is not already connected to nodes y or z, breaks the edge (y, z), and connects to nodes y and z. This edge breaking and reconnection ensures that the degree of node x increases by 2, while the degrees of nodes y and z remain unchanged.

If G' has fewer than d+1 nodes, G' will be a complete graph (and all its nodes will be degree deficient). When the number of nodes in G' exceeds d+1, will be the focus of the discussions henceforth. As a matter of fact, until the number of nodes exceeds d, the graph is not d-regular. In practice, the number of nodes in the graph is typically much larger than the degree d.

Notice that if d is odd, and G' has an even number of nodes (greater than d+1), adding node x to G' will result in a graph where all but one node has a degree d, and node x is degree deficient by 1. In all other cases, the graph will be d-regular (as long as there are more than d+1 nodes in the graph). Further, by definition, G∈$G_{r^3}$ (if G' has more than d nodes).

The edges chosen by node x should be node-disjoint, but embodiments of the invention are not limited to a specific method of choosing the edges. For example, the edges can be chosen randomly, based on a cost metric, or any other way as will be appreciated by those skilled in the art. The resilience properties of the resulting graphs do not depend on the edge selection process. This leaves us with the flexibility to eventually select edges to achieve other good properties such as locality without sacrificing resilience.

Another property of the graph is that it allows "rollback"; i.e., nodes can be easily deleted with some reconnections of edges, while keeping the resulting graph in $G_{r^3}$. In the following, the case when a node x gracefully leaves the network (e.g., not via a failure) is considered.

There are two cases to consider. If x is the last node added, then it can be removed simply by recreating the edges that were broken at the time of its addition. If node x is not the last node added, it conceptually "exchanges places" with the last node to enter and then leaves as if it was the last node. For these operations to be possible, the nodes in the graph need to know which node is the last node to be inserted and to remember which edges were broken at the time of their addition.

Node failures are conceptually the same as node removals. The difference lies in how and where the information on the edges broken when a node enters is retained. Clearly, the failed node is incapable of providing this information. Hence, the information needs to be kept at other nodes in the network. In particular, a technique of maintaining (replicating) the information at one's neighbors is discussed in greater detail below. Standard reliability principles used extensively in computer systems and networks dictate that to handle k failures, a replication of k+1 (or equivalent coding techniques to recreate the information) is used and usually sufficient. Additional details and proofs of the graph properties are discussed in Appendix A at the end of the description.

As previously discussed, the notion of the last node in the graph is used for the node addition and removal process. In order to maintain an ordering of node additions, each node can be assigned a unique identifier when it enters the overlay graph. This identifier may change over time, as the nodes get added and removed from the overlay. Each node needs to store its own identity at any point in time. Additionally, in order to maintain the graph in a distributed fashion, a node needs to store the identities of the neighbors along its edges. Further, each node in the graph also needs to store the edges that were broken at the time when the node was added to the graph and the identity of the current last node. In summary, node removals and additions can use the following information (defined as $P_i$) to be maintained at each node i:

1) Set of edges with i as an endpoint;
2) Set of edges broken when i was added;
3) Unique node identifier;
4) The current last node in the graph; and
5) The identity of neighbor nodes along edges.

For example, assume that a node j is to be added to a graph G. As with all overlays, the node needs to be seeded with the identity of at least one overlay node. In our motivating peerto-peer application across network address translators, an introduction server can provide this information (e.g., a STUN server as described by J. Rosenberg et al., "STUN—Simple Traversal of User Datagram Protocol (UDP) Through Network Address Translators (NATs) —RFC 3489, http://www.faqs.orglrfcslrfc3489.html, March 2003). The case when the existing graph already has more than d+1 nodes when a new node j is to be added is considered below. In cases where the existing graph already has d+1 nodes or less, the node j can connect to all existing nodes in the graph.

Let node i be the node returned by the introduction server to node j. The introduction server may choose i at random from the set of graph nodes. The introduction server also may generate a unique identifier for node j which is greater than the identifiers of all existing nodes in the overlay graph. When node j joins the graph it first places a lock on node i. After the node j has obtained a unique identifier, it begins to find edges that it can break to insert itself into the graph. One possible approach to edge selection is to pick edges at random in the graph. The following describes how one such random scheme can be implemented.

In order to do a random selection of edges for j, node i will insert a token in the graph with a time to live (TTL) proportional to the maximum diameter of the graph, e.g., $$k \cdot \left\lceil \frac{n+1}{d} \right\rceil k \in \mathcal{N}.$$

S is defined to be a set of nodes that cannot be selected by the token passing scheme, and start by setting S=j. The token is only passed to feasible nodes, i.e., nodes which are not in S. Once a node receives the token, the token's TTL counter is decremented by one, and if the TTL counter is greater than one the token is passed to a feasible neighbor. Once the TTL counter has reached zero, the node currently with the token, $t_1$ selects one of its unselected neighbors, $t_2$ and disconnects itself from $t_2$. Then, $t_2$ and $t_1$ make a connection to j and S=S∪$\{t_1,t_2\}$. This process is repeated d/2 times, if d is odd then connect j to any other nodes which do not have a degree of d before starting the process. We know that every node has at least one node not in S because each node has a connectivity of d and a total of d nodes are required to completely insert node j in the graph. The process, as outlined above, takes two nodes and connects them to j. Therefore in the worst case after every insertion two nodes get added to the set S, but at the beginning of the final insertion every node has at least two neighbors which are not in S. Note that if node i has been added to S as a result of one of i's edges being selected, in the subsequent edge selection runs when the token is inserted into the graph it is simply passed to one of a i's neighbors without decrementing the TTL counter.

The node addition algorithm described above is just one of many distributed approaches to adding a node, j to the graph. For example, a finer grained locking scheme would obtain a lock only to get a unique node identifier. This would allow concurrent node additions on the graph. The last node in the graph does not have any of its edges broken by any nodes with a lower node identifier than itself. This can be enforced by the node insertion process by considering only edges between nodes with lower identifiers than the node currently being inserted.

Note that the discussion above enumerates only a small subset of the distributed approaches to node addition, and is not intended to be an exhaustive list. Other methods will be apparent to those skilled in the art, such as, directing or weighting the node selection process based on knowledge of the node being added (e.g., will frequently connect to node z, then one of the edges split should include node z, so that there is a minimal number of hops to get between the nodes).

As discussed in the earlier sections, the node removal process should guarantee that the graph that remains after node removal is still in $G_r^3$ thus preserving its resilience properties. This section describes an embodiment of the invention including the distributed node removal process.

Recall that during a node removal, the node under removal, say j, sends the last node l with identifier $id_l$ a message indicating its desire to leave. This message also contains the information $P_j$, outlined in the beginning of this section, needed for l to take j's place in the graph. Once l receives this message, it initiates the node removal process. It sends messages to its neighbors asking them to reconnect the edges broken when l was added to the overlay graph. Node l, subsequently, establishes connections to all of j's neighbors and informs nodes in the graph that it is no longer the last node and has assumed the identity of j. This message also contains i's original node identifier, $id_l$. Any node that receives this message knows that $id_j$ has been released and available for reassignment and also knows that node with identifier $id_{l-1\_}$ is now the last node in the graph.

If the last node l is under removal, l will send out a message informing the graph that it is no longer the last node. The edges broken when l was added will get reconnected. All nodes will then set the last node in the graph to be one with $id_l$. Multiple node removals can be handled sequentially through a similar node removal process. Note that the notion of the last node is useful for this removal process in order to keep the graph in $G_r^3$.

As previously discussed, a node failure is equivalent to a node removal except that the failed node j cannot inform the last node l in the graph, that it is leaving the graph. To ensure that the information needed for j's a removal and the restoration of the graph is available across at least d/2 failures, node j in the graph needs to have its information $P_j$ replicated at some or all of its neighbors. Therefore each node may need to hold O(dx) information where x is the size required to store the information Once a node fails, its neighbors will send a message to node l informing it that j has failed. Note that only the first message to arrive at node l will be serviced and all other messages will be dropped. The remainder of the procedure is the same as the one described above with regard to the removal of a non-last node.

For the case of multiple node failures, if the number of failures is more than d/2, a simple solution can be to rebuild the graph. If the number of failures is less than or equal to d/2 the following solution can be considered. Sequentialize the removal process by starting with the node with the highest node identifier. If the node with the highest identifier $id_l$ fails, requests for other node removal will fail until a new last node is established. Once the nodes are informed that node with identifier $id_{l-1}$ is the new last node in the graph, the requests for node removal are again sent to the new last node. Since the last node can only process one removal at a time, these requests can be handled on a first-come first-serve basis.

Those skilled in the art will appreciate from the foregoing description that embodiments of the invention can include methods for constructing and maintaining a peer-to peer overlay graph. For example, a method for constructing a peer-to-peer overlay graph, can include adding a node j to the overlay graph, where adding the node j includes: choosing an edge that is not connected to the node j, 210, and breaking the edge and connecting the node j to broken edge nodes previously connected to the edge, 212. The adding process is repeated if additional connections are needed, 214, (e.g., less than d or d−1 for deficient nodes). Then, addition data is stored for the node j, 216, which can include a set of edges with node j as an endpoint; a set of edges broken when node j was added; a unique node identifier for node j; a current last node in the graph; and/or identities of neighbor nodes along edges connected to node j.

The method can further include connecting node j to a first node in the overlay graph, 208, if the first node is degree deficient, 206. Additionally, as illustrated, an introduction server can be communicated with, 202, and the introduction server can refer node j to the edge or to the first node in the overlay graph, if the first node is degree deficient, 204. The introduction server does not have to be a node that is connected to node j in the overlay graph. Further, the introduction may refer the incoming node j to another node in the overlay graph that node j does not connect to. Accordingly, the introduction server provides a means to allow node j access to the overlay graph, but is not required to refer node j directly to the node or edge it ultimately connects to.

Figure 3:
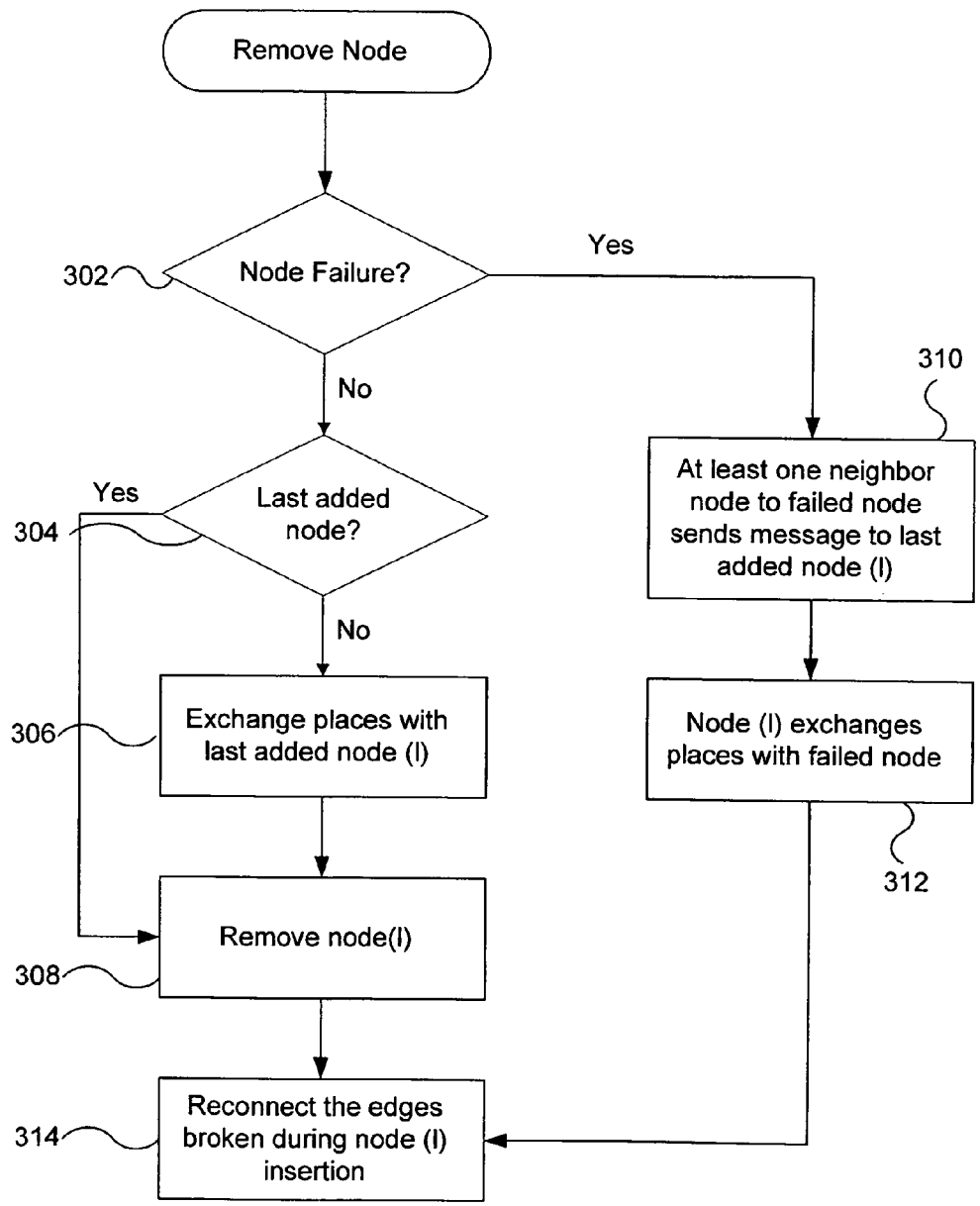
FIG. 3 illustrates a flowchart representing methods in accordance with at least one embodiment of the invention.

Referring to FIG. 3, a method for removing a node from the peer-to peer overlay graph according to at least one embodiment of the invention is illustrated. For example, the method can include removing a last node k from the overlay graph. If the node k is disconnected due to a node failure, 302, then a message is transmitted (e.g., by a neighbor node) to the last node added indicating the identity of the failed node k, 310, and the last node added (l) exchanges places with the failed node k, 312. If the node k is the last node added 304, then the node is removed, 308 and the previous connections reconnected, 314. If the node k is not the last node l, 304, node k is exchanged with the last node l, 306. The last node l is removed, 308 and then, the edges broken during the insertion of the last node l into the graph are reconnected, 314. The edges broken during the insertion of the last node l added to the graph can be determined by retrieving node addition data for last node l. Further, as discussed in the foregoing, exchanging node k with the last node added can include inserting the last node l into the graph in the location of node k and establishing the same connections between the last node l and neighbor nodes at the insertion as was previously established for node k.

Figure 4:
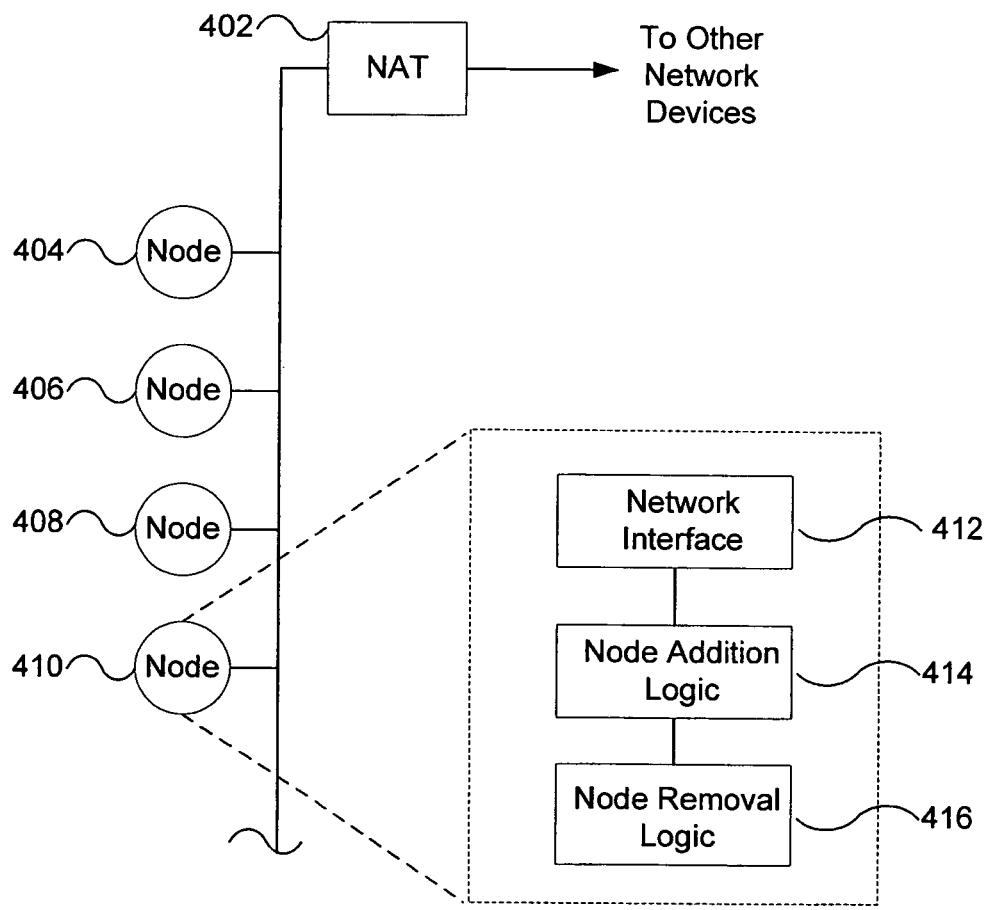
FIG. 4 illustrates a block diagram in accordance with at least one embodiment of the invention.

Another embodiment of the invention can include an apparatus for constructing and maintaining a peer-to peer overlay graph. For example, as illustrated in FIG. 4, the apparatus can include logic configured to add a node j to the overlay graph, 414, and logic configured to remove the node j, 416, from the overlay graph. The logic can be embedded in each node (e.g., 404, 406, 408, 410). As illustrated and discussed previously, the nodes can be network devices (e.g., VoIP telephones) that are connected to other nodes locally and via a network address translator (NAT) 402, gateways, and the like to other to remote nodes/devices. In the distributed architecture discussed herein, each node can include the necessary logic to interface to the network, 412, and logic related to constructing and maintaining a peer-to peer overlay graph, as discussed herein. Those skilled in the art will appreciate that the elements and arrangements shown are merely for purposes of illustration and should not be interpreted as limiting embodiments of the invention. Further, well know elements such as power supplies, displays, storage device and the like, have not been illustrated, so as not to distract from the discussion of the embodiments of the invention.

The logic configured to add 414 the node j can further include logic configured to choose an edge that is not connected to the node j; logic configured to break the edge and to connect the node j to broken edge nodes previously connected to the edge; logic configured to repeat the adding process if additional connections are need; and logic configured to store node addition data for the node j. Further, the logic configured to remove 416a node k from the overlay graph can include: logic configured to transmit a message to a last node added indicating the identity of failed node k and exchanging node k with the last node added, if node k is disconnected due to a node failure; logic configured to exchange node k with the last node added if the node k is not the last node added; logic configured to remove the last node added, if the node k is not disconnected due to a node failure; and logic configured to reconnect the edges broken during the insertion of the last node to the graph. Those skilled in the art will appreciate that the other logic elements can be included in embodiments of the invention to perform the functions described herein. Further, the implementation of the logic elements is not limited to the discussed or illustrated configurations.

The following description discusses simulations, where even values for d are considered for simplicity. As is illustrated in the connectivity proofs at the end of this description in Appendix A, the connectivity properties hold for both odd and even values of degree d.

Figure 5:
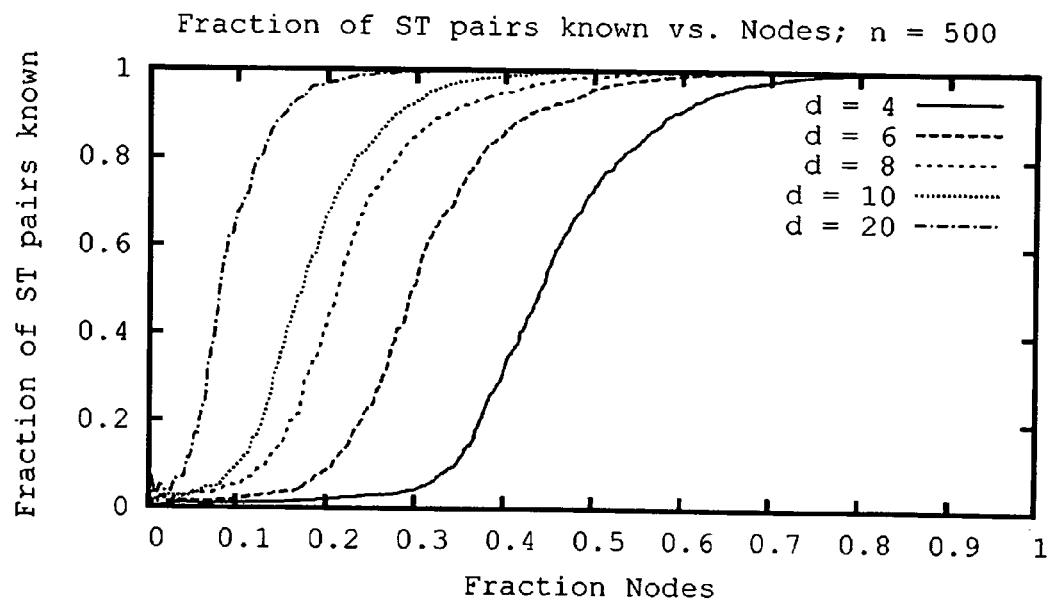
FIG. 5 illustrates graph connectivity vs. the fraction of nodes remaining.

Regarding node failures, the effect of node removal on the connectivity of the graph is considered. Connectivity of the graph is measured as the fraction, actual/maximum, of source destination (ST) pairs that have a path between them. Naturally the maximum number of pairs is n(n−1) where is n the number of nodes in the graph. FIG. 5 displays the behavior of connectivity with respect to node removals. The x axis gives a fraction of the total number of nodes remaining, starting with 500 nodes. The y axis gives the fraction of the total number of ST pairs that are reachable after the given fraction of nodes have failed. This data is provided for a number of values of node degree, d. Each data point in the figure is an average over 1000 randomly generated graphs.

FIG. 5 illustrates that as the degree of a graph increases the average number of nodes required to be removed before the graph becomes disconnected increases. From FIG. 5 it is evident that the number of required removals exceeds the tight d/2+1 bound. For example, for d=4 approximately 20%=100 nodes need to be removed before the graph becomes disconnected. These simulation results suggest that on average the graphs in $r^3$ exhibit at least similar resilience as other random regular graphs.

Next it is shown that the d/2+1-node connectedness bound is tight and has been observed in our simulations. Additionally, the probability of experimentally finding graphs and failures in these graphs that exhibit this bound is presented. In particular graphs with degree, d of 4 are considered. Let f be the number of node failures. The value of f is set to f=3 in the simulations and experiments are run to find the graphs that exhibit the tight bound. Let n be the number of nodes in the graph. For each value of n, every feasible set of nodes is attempted to be deleted until either a failure (graph becomes disconnected) is found or all feasible sets are exhausted. It can be observed that a failure was caused only when a graph contained the substructure in FIG. 6, where the top two light colored nodes (e.g., 602 and 604) may be connected to other nodes not present in the figure. Further, removing the black shaded nodes (e.g., 606, 608, 610) will disconnect the graph.

Figure 6:
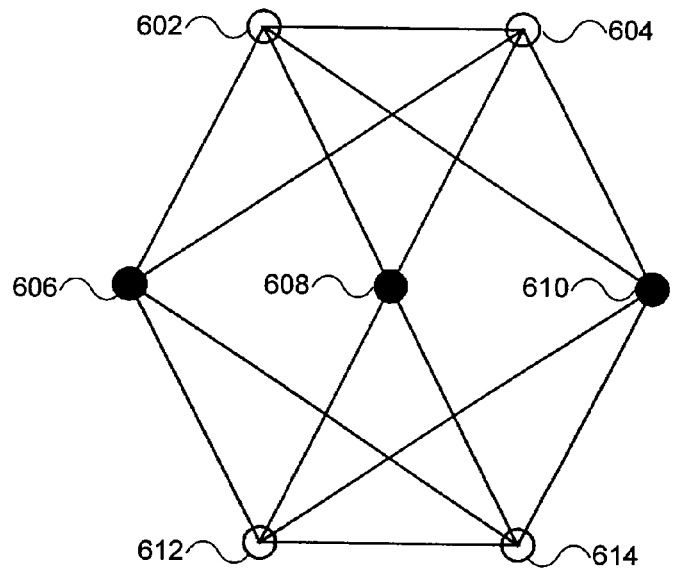
FIG. 6 illustrates an overlay graph that is a d regular graph.
Figure 7:
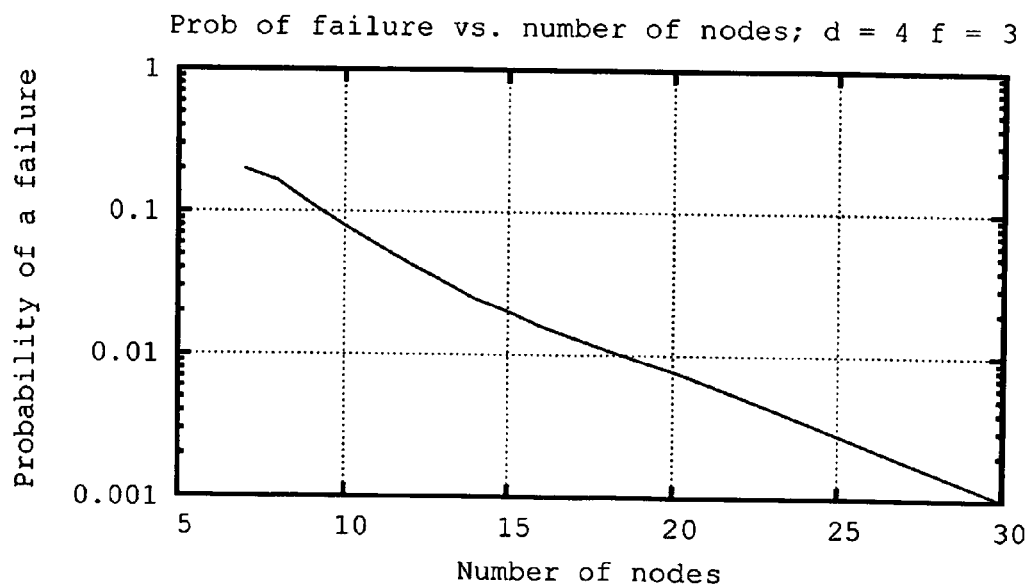
FIG. 7 illustrates the probability of finding a disconnect in the graph vs. the number of nodes.

The probability of finding a graph with the structure found in FIG. 6 decreases with the number of nodes in the graph. As FIG. 7 illustrates, the probability of finding 3 nodes which will disconnect a graph with d=4 is exponentially decreasing as n increases. The results shown are over 1,000,000 random graph instances.

Figure 8:
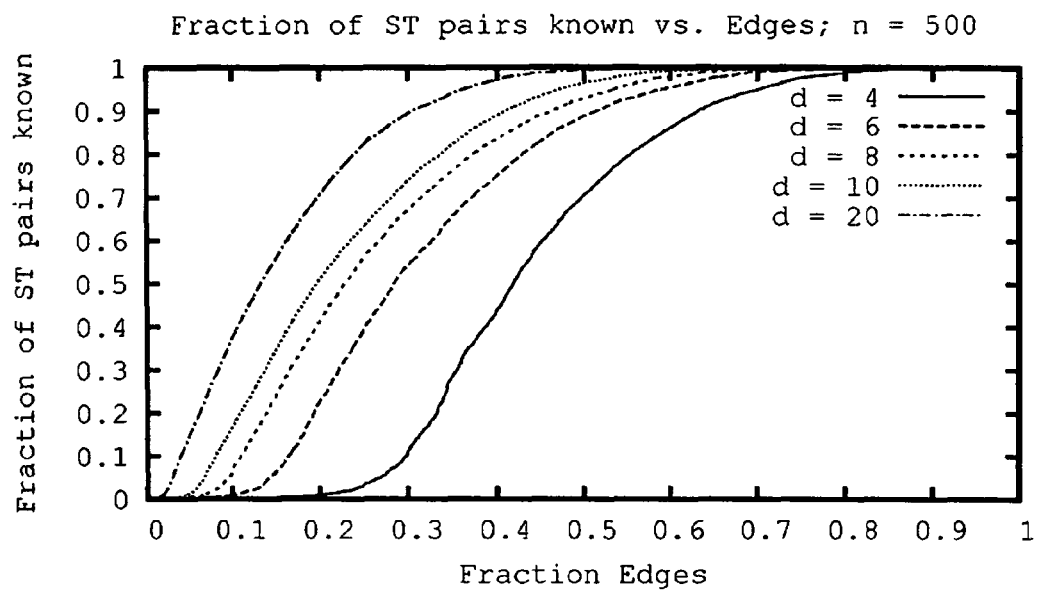
FIG. 8 illustrates graph connectivity vs. the fraction of edges remaining.

Next the effect of edge removal on the connectivity of the graph is considered. Connectivity of the graph is measured as the fraction, actual/maximum, of source destination (ST) pairs that have a path between each other. As discussed earlier, the maximum number of pairs is n(n−1) where n is the number of nodes in the graph. FIG. 8 illustrates the behavior of connectivity with edge removals, represented as a fraction of the total number of edges remaining, starting with 500*d/2 edges. This data is evaluated for a number of values of node degree, d and is averaged over 1000 randomly generated graphs.

FIG. 8 suggests that as the degree of the graph increases the average number of edges required to be removed before there is a disconnect in the graph increases. From the figure it is evident that the number of required removals exceeds the tight d bound. For example, for d=4 approximately 15%=150 edges need to be removed before the graph becomes disconnected.

Figure 9:
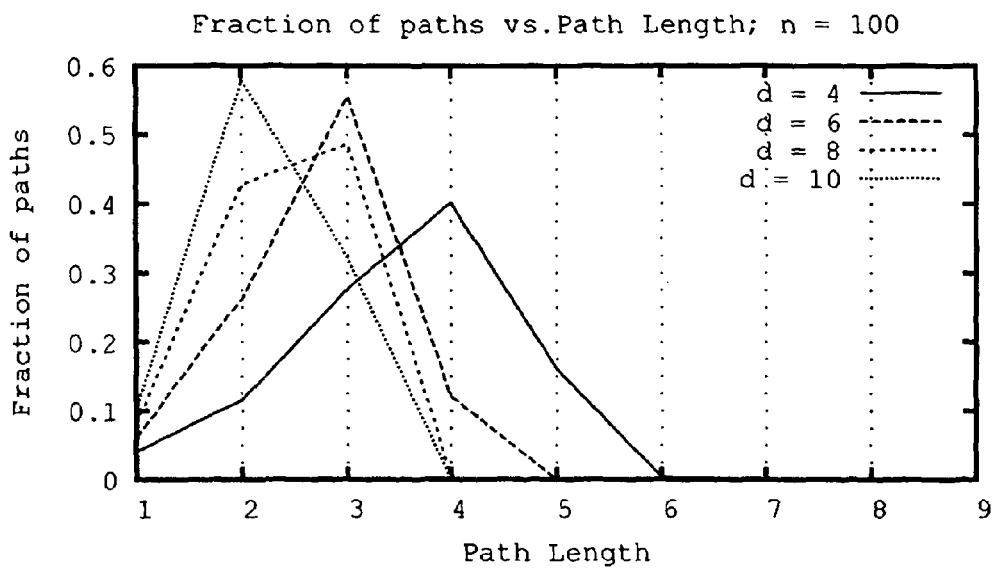
FIG. 9 illustrates the fraction of paths vs. path length for n=100.
Figure 10:
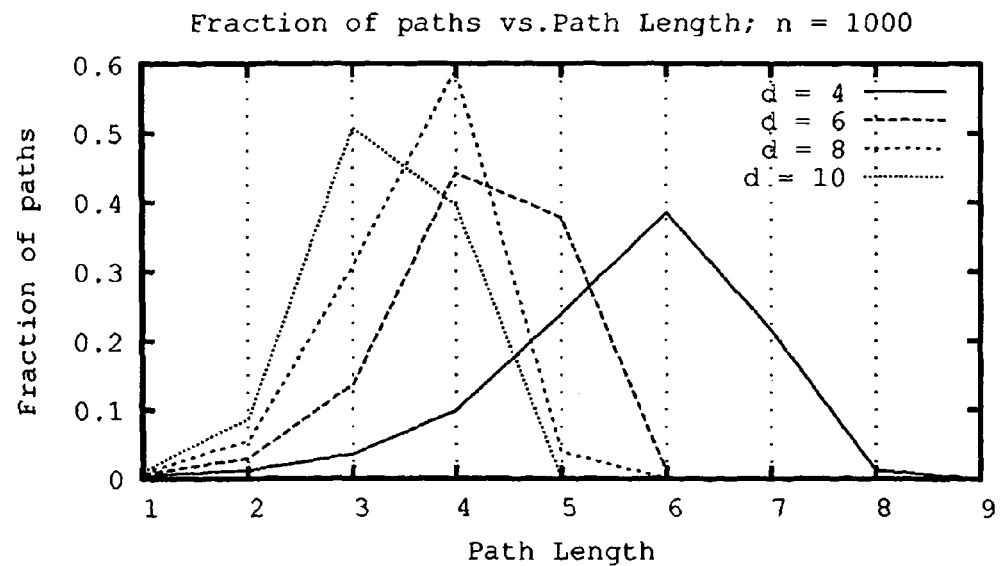
FIG. 10 illustrates the fraction of paths vs. path length for n=1000.

In the following, observations of are made of how the average path length, over 10000 random graph instances, behaves with n and d. Referring to FIGS. 9 and 10, as the number of nodes in the graph increases and the node degree is fixed, the average path length increases with n. In FIGS. 9 and 10, the path lengths of n=100 and 1000, and d∈{4, 6, 8, 10} are plotted, respectively. The figures also show that the average path length decreases as d increases when n is fixed. The maximum average path length is approximately $\log_d n$.

Regular graphs provide a basis for constructing degree constrained overlay networks. Embodiments of the invention address the problem of constructing provably highly resilient regular graphs. The methods and systems to construct a specific type of random d-regular graphs called $r^3$ graphs according to embodiments of the invention are disclosed herein. These graphs are extremely efficient to build and maintain, and as discussed above. Further, these graphs have good properties in terms of resilience. In particular, the $r^3$ graphs are 1+d/2-node and d-edge connected, as discussed above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope embodiments of the present invention.

The methods, sequences of actions and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components separate from the processor.

While the foregoing disclosure shows illustrative embodiments of the invention, it should be noted that various changes and modifications could be made herein without departing from the scope of the invention as defined by the appended claims. For example, although many of the foregoing illustrations discuss a graph having a fixed degree, embodiments of the invention are not limited to this feature and may include graphs having nodes with different degrees. Further, although the foregoing description used the concept of the last node added as a basis for removal and addition of nodes to the overlay graph, embodiments of the invention are not limited to using only the last node added.

For example, in large overlay networks the process may be generalized to include tracking ancestor nodes. When a node is first inserted, its neighbor nodes are called the ancestor nodes of the node. Then, as long as its neighbors are its ancestors a node can be considered a young node. Otherwise, the node can be considered an old node. Then, to remove a node from the graph, the candidate node for removal may trade space with any of the young nodes in the graph.

Accordingly, in large graphs the young nodes can be processed in the same manner as the last node (which is always a young node), as discussed in the foregoing. Depending of the edge selection process and the size of the graph, many nodes can be young. For example, consider a large graph, where nodes A and B are added. Further, assume that the edges that were broken when A was inserted are a distinct set from the edges that were broken when B was inserted. In accordance with embodiments of the invention, it is immaterial whether node A or node B was last, as either of them could play the role of the last node (e.g., to facilitate removal of nodes from the graph). The data stored to support this deconstruction process can include the list of ancestor nodes of a node so that it is possible to tell whether a node is young or not, and, as discussed above, the list of edges that were broken during the insertion process. This data is stored at the node itself and also at the neighbors in order to address potential failures, where the node to be removed is not available. When a node needs to be removed from the graph, a young node can be found by exchanging messages between the nodes to locate a young node for the exchange, if the node to be removed is not a young node. Accordingly, it would not be necessary to keep track of which node is the last node added.

Figure 13:
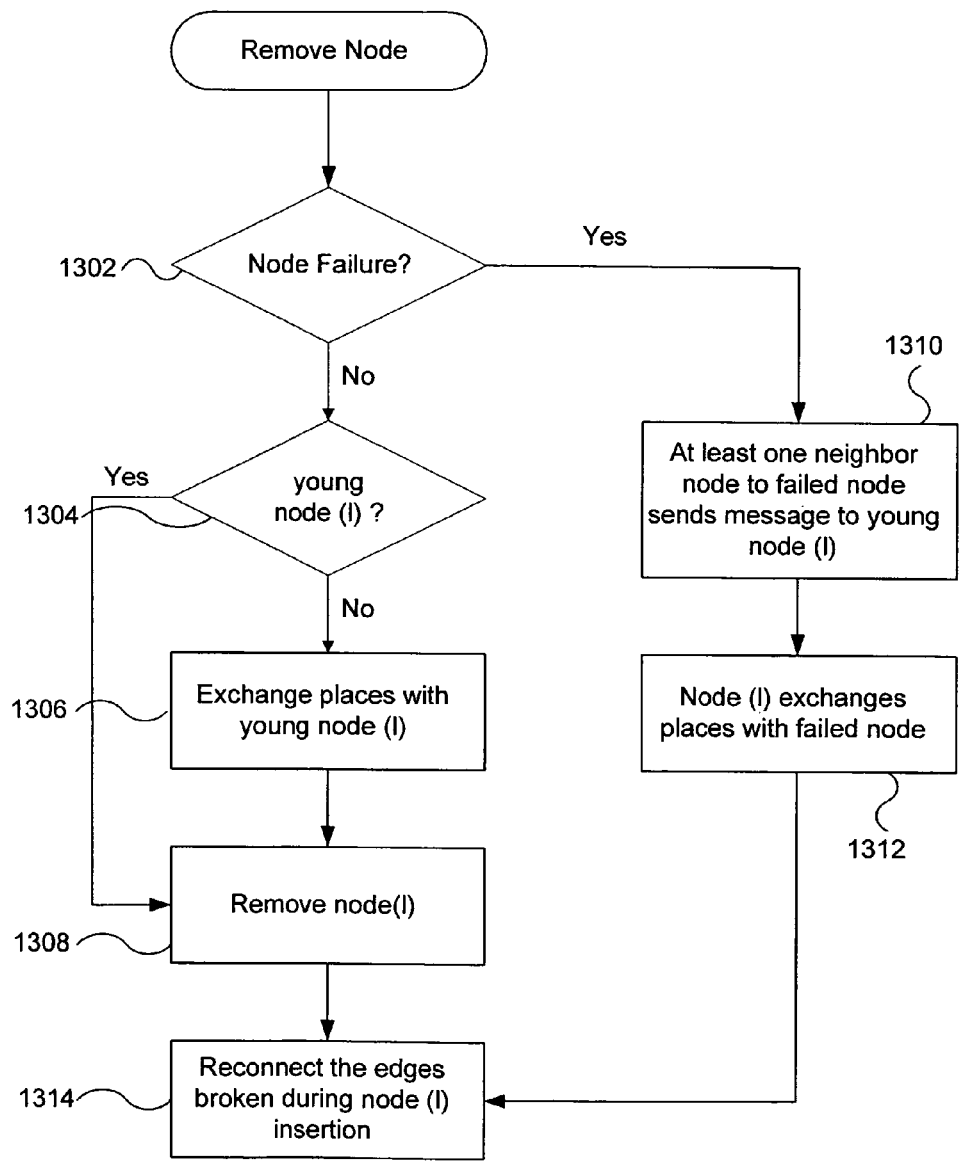
FIG. 13 illustrates a flowchart representing methods in accordance with at least one embodiment of the invention.

Referring to FIG. 13, a method for removing a node from the peer-to peer overlay graph according to at least one embodiment of the invention is illustrated. If the node is disconnected due to a node failure, 1302, then a message is transmitted (e.g., by a neighbor node) to the a young node l in the graph indicating the identity of the failed node, 1310, and the young node l exchanges places with the failed node, 1312. If there is no node failure 1302 and the node to be removed is the young node l, 1304, then the node l is removed 1308 and the edges broken during the insertion of node l are reconnected. Where node l was connected to a deficient node, then the connection is just removed. However, if the node to be removed is not a young node l, 1304, then the node is exchanged with the young node l, 1306. Node l is removed, 1308, and the edges broken during the insertion of young node 1 to the graph are reconnected, 1314. The edges broken during the insertion of young node 1 to the graph can be determined by retrieving node addition data for young node 1. Further, as discussed in the foregoing, exchanging a node to be removed with the young node 1 can include inserting the young node 1 into the graph in the location of the node to be removed and establishing the same connections between the young node 1 and neighbor nodes as was previously established for the node to be removed. Then, the node to be remove assumes the identity of young node 1.

Further, those skilled in the art will appreciated that the functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

APPENDIX A

Graph Properties

A. Removal Keeps the Graph Still in $G_r^3$

The $G_r^3$ class is defined by a sequential construction process. As a consequence, a deconstruction process can always take place, removing the nodes starting with the last inserted node. This deconstruction step evidently produces a graph in the $G_r^3$ class.

B. Connectedness

In this section, we prove a tight bound on the connectivity of the graphs in $G_r^3$. If S and T are disjoint sets of nodes in a graph g, we use the notation $c_g(S, T)$ to denote the number of edges in g between S and T, which we refer to as cross edges. If $g \in G_r^3$ and $|g| \geq d+1$, we define the lineage of g as a sequence of graphs $g_0, \ldots, g_n$ starting with the complete graph $g_0 = K_d$ and ending with $g_n = g$ that describe the construction of g. By definition of $G_r^3$, for all $g \in G_r^3$ with $|g| \geq d+1$, there is at least one lineage of g.

The results on edge and node connectivity are only interesting when $|g| > d+1$ because up to that point, the graphs in $G_r^3$ are complete graphs. The theorems of this section are trivial when $|g| \leq d+1$.

We first show a property about cross edges between two sets of nodes that partition a $G_r^3$ graph, in that they do not reduce when nodes are added to either set.

Lemma 4.1: If $g \in G_r^3$ is formed by adding one node to $g' \in G_r^3$ and if S and T form a partition of g then $$c_g(S,T) \geq c_{g'}(S \cap g', T \cap g').$$

Proof An edge $e \in g'$ going from $s \in S \cap g'$ to $t \in T \cap g'$ is either left unchanged by the construction of g or is replaced by two edges, one going from s to n and the other from n to t, exactly one of which connects S and T. Thus, the construction of g cannot decrease the number of connections between S and T.

The following provides a lower bound for the number of cross edges between two sets that partition a $G_r^3$ graph.

Lemma 4.2: If $g \in G_r^3$ and if g can be partitioned as S+T, then $$c_g(S,T) \geq x(1+d-x)$$

where $x = \min\{d/2, |S|, |T|\}$.

Proof: If $|g| \leq d+1$, $c_g(|S|, |T|) = |S||T|$ and the result holds. Assume $|g| > d+1$. Let $g_0, \ldots, g_n = g$ be a lineage of g. Starting with $g_n$, we go back through the ancestor until one is found such that $\min(|S \cap g_i|, |T \cap g_i|) = x$. There will be such an i because $|S \cap g_0| + |T \cap g_0| = d+1$. At this point, at least one of the two partition elements $S \cap g_i$ or $T \cap g_i$ has exactly x elements. Because that component can have at most $x(x-1)$ internal connections it must have $xd - x(x-1) = x(1+d-x)$ external ones. Using the previous lemma we can write $$\begin{aligned} c_g(S, T) &= c_{g_n}(S \cap g_n, T \cap g_n) \\ &\geq c_{g_{n-1}}(S \cap g_{n-1}, T \cap g_{n-1}) \\ &\phantom{=}\ldots \\ &\geq c_{g_i}(S \cap g_i, T \cap g_i) \\ &= x(1+d-x) \end{aligned}$$

From the above lemma the following theorem automatically follows which shows that removing a large number of edges (i.e., any d−1 edges) from a graph in $G_r^3$ still maintains connectivity.

Theorem 4.3: If $g \in G_r^3$ then g is d edge connected.

Proof: The result is trivial if $|g| \leq d+1$. Assume $|g| > d+1$. For any partition $g + S + T$ with $|S| > 0$ and $|T| > 0$, $x = \min\{d/2, |S|, |T|\} \geq 1$. Because $x(1+d-x)$ is minimized at $x=1$ over the range $\{1, \ldots, d/2\}$, the above lemma implies $c_g(S,T) \geq 1(1+d-1) = d$.

We now prove one of the main results of our paper: that graphs in $G_r^3$ are highly node-connected; i.e., removing even d/2 nodes in such a graph provably maintains connectivity.

Theorem 4.4: If $g \in G_r^3$ then g is $1+d/2$ node connected.

Figure 11:
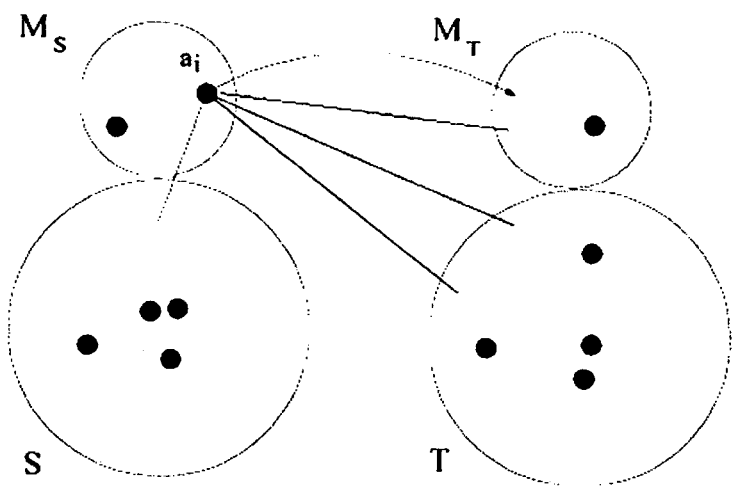
FIG. 11 illustrates construction of an overlay graph.

Proof: The result is trivial if $|g| \leq d+1$. Assume $|g| > d+1$. Let M be a critical set of size n that could disconnect the remaining nodes: There is a a partition $g = S + M + T$ such that $c_g(S, T) = 0$, $|S| > 0$, $|T| > 0$ and $|M| = n$. Let the critical nodes be $a_1, \ldots, a_n$. Given a partition $M = M_S + M_T$, we can define $$u_i = \begin{cases} \text{connections between } a_i \text{ and } T + M_T \text{ if } a_i \in M_S \\ \text{connections between } a_i \text{ and } S + M_S \text{ if } a_i \in M_T \end{cases}$$

and $u = \max_{1 \leq i \leq n} u_i$. We now construct a partition $M = M_S + M_T$ for which $u \leq d/2$. We start with $M = M + \phi$ and iteratively move the nodes $a_i$ (illustrated in FIG. 11) from $M_S$ to $A_T$ whenever $u_i > d/2$. Moving node $a_i$ from $M_S$ to $M_T$ will reduce $u_i$ to something no larger than d/2. In addition, $u_j$ for $a_j \in M_T$ will not increase. The iteration stops when $u_i \leq d/2$ for all $a_i \in M_S$ and at that point, $\max_{1 \leq i \leq n} u_i \leq d/2$.

Consider now the edges out of any of the nodes $a_i$ for which $u = u_i$ and assume without loss of generality that $a_i \in M_S$. Because $u = u_i$, $T + M_T$ must have it least u nodes. On the other hand, the remaining $d - u \geq u$ edges must connect to $S + M_S$ and we conclude that both $S + M_S$ and $T + M_T$ must have at least u nodes.

We can apply the above lemma to get $$u(1+d-u) \leq c_g(S+M_S, T+M_T) = \sum_{1 \leq i \leq n} u_i \leq nu$$

which implies $n \geq 1+d-u > d/2$.

We complete this section by showing that the bounds of the two theorems are tight. As far as the edge connectivity is concerned, it is clear that $g \in G_r^3$ is not d edge connected because the set of edges originating at a node constitutes a critical set. As for the node connectivity, consider three sets S, T and M each with $1+d/2$ nodes and the adjacency matrix

TABLE I

ADJACENCY MATRIX FOR A (1 + d/2) NODE CONNECTED GRAPH IN $G_r3$

Figure 12:
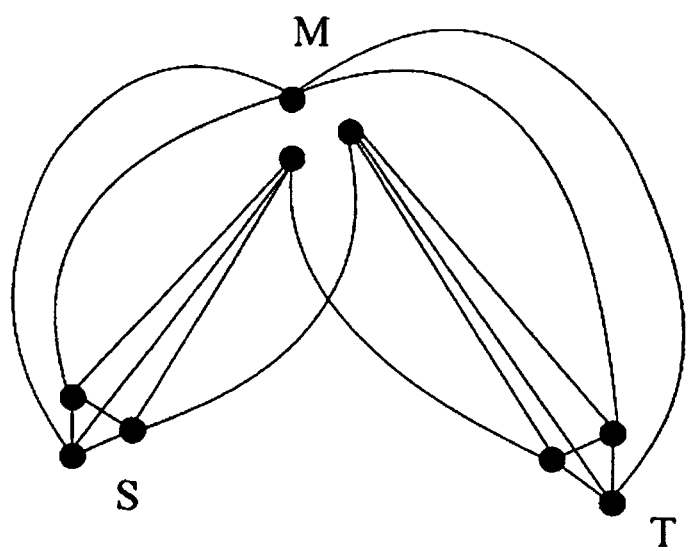
FIG. 12 illustrates a graph corresponding to the matrix in Table 1.

|   | S   | M   | T   |
|---|-----|-----|-----|
| S | 1 − I | 1 − I | 0 |
| M | 1 − I | 0 | 1 − I |
| T | 0 | 1 − I | 1 − I | where 1, 0 and I are square matrices of dimension $(1+d/2) \times (1+d/2)$. The rows and the columns of this adjacency matrix are easily seen to add up to d and the set of nodes M is critical to the connectivity between S and T. The graph corresponding to this construction with d=4 is displayed in FIG. 12.

Graph Diameter

We next present the best upper bound on the graph diameter.

Theorem 4.5: For a d-regular graph in $G_r3$ with n nodes, the diameter of the graph is at most $$O\left(\frac{n-1}{d}\right)$$

Proof: There exist a simple construction for a graph in $G_r3$ that adds nodes by breaking edges connecting some of the d+1 most recently added nodes. For example, for d=6, the construction is to break the edges between (n−1, n), (n−4,n−2) and (n−6,n−3). For an arbitrary d, the construction is based on breaking the edges $(n-a_i, n-a_i-i)$ for $1 \leq i \leq d/2$. These edges are sure to be available provided that $$\{0, \ldots, d/2-1\} \subset \{a_i, a_i-i, 1 \leq i \leq d/2\}.$$

Indeed, edge $(n-a_i, n-a_i-i)$ was created when node $n-a_i-i$ was inserted.

Using this construction, we can measure the diameter of the graph with respect to the first node added to the graph. Since all other nodes added to the graph will be placed as far away from the first node as possible. Counting from the first node shows that the maximum diameter of a graph is $$O\left(\frac{n-1}{d}\right).$$

Since the diameter of a graph in $G_r3$ can be $$O\left(\frac{n-1}{d}\right),$$

not all graph in $G_r3$ are expander graphs, since expander graphs have a diameter of O(log n).

What is claimed is:

1. A computer-implemented method for constructing a peer-to-peer overlay graph, comprising:
   providing a computer including a memory configured to store a peer-to-peer overlay graph;
   adding a node j to the overlay graph, where adding the node j includes:
   choosing an edge that is not connected to the node j;
   breaking the edge and connecting the node j to broken edge nodes previously connected to the edge; and
   repeating the adding process if additional connections are needed.

2. The method of claim 1, wherein the method of adding further comprises:
   connecting to a first node in the overlay graph, if the first node is degree deficient.

3. The method of claim 1, wherein the method of adding further comprises:
   communicating with an introduction server that refers the node j to the edge or to a node in the overlay graph.

4. The method of claim 1, wherein additional connections are needed if a degree of the node j is less than d, where d is the degree of node j.

5. The method of claim 4, wherein d is the degree for all nodes in the overlay graph.

6. The method of claim 1, further comprising:
   removing a node k from the overlay graph including:
   if the node k is not a young node l, exchanging node k with the young node l;
   removing the young node l and
   reconnecting edges broken during the insertion of young node l into the graph.

7. The method of claim 6, further comprising:
   determining node k is disconnected due to a failure;
   transmitting a message to young node l indicating the identity of the failed node k; and
   exchanging node k with young node l.

8. The method of claim 7, wherein at least one neighbor node to failed node k transmits the message to young node l.

9. The method of claim 6, wherein the edges broken during the insertion of the young node l to the graph is determined by retrieving node addition data for young node l.

10. The method of claim 6, wherein exchanging node k with the young node l includes:
    inserting young node l into the graph in the location of node k;
    establishing the same connections between young node l and neighbor nodes as was previously established for node k; and
    identifying node k as young node l.

11. The method of claim 6, wherein young node l is a last node added to the graph.

12. The method of claim 6, wherein young node l is determined as a node that is connected only to ancestor nodes.

13. The method of claim 1, further comprising:
    storing node addition data for the node j.

14. The method of claim 1, wherein the node addition data comprises at least one of:
    a set of edges with node j as an endpoint;
    a set of edges broken when node j was added;
    a unique node identifier for node j;
    a current last node in the graph; or
    identities of neighbor nodes along edges connected to node j.

15. An apparatus for constructing a peer-to-peer overlay graph, comprising:
    a computer processor including logic configured to add a node j to the overlay graph, wherein the logic configured to add the node j includes:
    logic configured to choose an edge that is not connected to the node j;
    logic configured to break the edge and to connect the node j to broken edge nodes previously connected to the edge; and
    logic configured to repeat the adding process if additional connections are needed.

16. The apparatus of claim 15, wherein the logic configured to add the node j further comprises:

logic configured to connect to a first node in the overlay graph, if the first node is degree deficient.

17. The apparatus of claim 15, wherein the logic configured to add the node j further comprises:
    logic configured to communicate with an introduction server that refers the node j to the edge or to a node in the overlay graph.

18. The apparatus of claim 15, wherein additional connections are needed if a degree of the node j is less than d, where d is the degree of node j.

19. The apparatus of claim 18, wherein d is the degree for all nodes in the overlay graph.

20. The apparatus of claim 15, further comprising:
    logic configured to remove a node k from the overlay graph, including:
    logic configured to exchange node k with a young node l, if the node k is not young node l;
    logic configured to remove young node l; and
    logic configured to reconnect the edges broken during the insertion of young node l into the graph.

21. The apparatus of claim 20, further comprising:
    logic configured to determine node k is disconnected due to a failure; and
    logic configured to transmit a message to young node l indicating the identity of the failed node k; and
    logic configured to exchange node k with young node l.

22. The apparatus of claim 21, wherein at least one neighbor node to failed node k transmits the message to young node l.

23. The apparatus of claim 20, wherein the edges broken during the insertion of the young node l to the graph is determined by retrieving node addition data for young node l.

24. The apparatus of claim 20, wherein the logic configured to exchange node k with young node/includes:
    logic configured to insert young node l into the graph in the location of node k;
    logic configured to establish the same connections between young node l and neighbor nodes as was previously established for node k; and
    logic configured to identify node k as young node l.

25. The method of claim 20, wherein young node l is a last node added to the graph.

26. The method of claim 20, wherein young node l is determined as a node that is connected only to ancestor nodes.

27. The apparatus of claim 15, further comprising:
    logic configured to storing node addition data for the node j.

28. The apparatus of claim 27, wherein the node addition data comprises at least one of:
    a set of edges with node j as an endpoint;
    a set of edges broken when node j was added;
    a unique node identifier for node j;
    a current last node in the graph; or
    identities of neighbor nodes along edges connected to node j.

29. An apparatus comprising a non-transitory computer readable medium storing computer readable instructions which when executed by a processor cause the processor to construct a peer-to-peer overlay graph by:
    adding a node j to the overlay graph, where adding the node j includes:
    choosing an edge that is not connected to the node j;
    breaking the edge and connecting the node j to broken edge nodes previously connected to the edge; and
    repeating the adding process if additional connections are needed.

* * * * *